United States Patent [19]

Yamamoto et al.

[11] 4,006,660

[45] Feb. 8, 1977

[54] FASTENER ELEMENT

[75] Inventors: Keiichi Yamamoto; Kozo Yamamoto, both of Tokyo, Japan

[73] Assignee: Yamamoto Byora Co., Ltd., Tokyo, Japan

[22] Filed: Oct. 30, 1975

[21] Appl. No.: 627,338

Related U.S. Application Data

[63] Continuation-in-part of Ser. No. 489,419, July 17, 1974, abandoned.

[30] Foreign Application Priority Data

| Sept. 8, 1973 | Japan | 48-105453 |
| Sept. 8, 1973 | Japan | 48-105454 |
| Sept. 8, 1973 | Japan | 48-105455 |
| Nov. 30, 1973 | Japan | 48-138207 |

[52] U.S. Cl. ............................................. 85/45
[51] Int. Cl.² ....................................... F16B 23/00
[58] Field of Search ............ 85/45, 9 R, 32 R; 145/50 A; 81/121 R, 120

[56] References Cited

UNITED STATES PATENTS

| 662,134 | 11/1900 | Rodd | 85/45 |
| 1,865,346 | 6/1932 | Wells | 85/32 R |
| 2,247,499 | 7/1941 | Hutchison | 85/45 X |
| 2,375,249 | 5/1945 | Richer | 85/45 |
| 3,295,572 | 1/1967 | Wing | 85/45 X |

FOREIGN PATENTS OR APPLICATIONS

| 1,398,771 | 4/1965 | France | 85/45 |
| 1,309,208 | 10/1962 | France | 85/45 |
| 1,558,026 | 1/1969 | France | 85/45 |

*Primary Examiner*—Ramon S. Britts

[57] ABSTRACT

A fastener element has at its male portion a plurality of grooves whose cross sections each form a fractional circle and a plurality of lobes whose cross sections each form a segmental outline of a larger circle, the inner wall of each said groove being connected to the lobe through a wall portion whose cross section assumes a curved line like configuration. The center of the fractional circle is situated nearer to the center of the larger circle than a conjunction of two tangential lines allowed tangentially to contact the larger circle at the intersections of the larger circle and fractional circle. The curved line is connected with the outline of the fractional circle at a point at which a radial line extending from the center of the larger circle is allowed tangentially to contact the fractional circle, or at a point situated farther from the larger circle center than the first-mentioned point.

14 Claims, 11 Drawing Figures

4,006,660

FASTENER ELEMENT

CROSS-REFERENCE TO RELATED APPLICATION

This application is a continuation-in-part application of the U.S. patent application Ser. No. 489,419 filed on July 17, 1974, now abandoned.

BACKGROUND OF THE INVENTION

This invention relates to a fastener element such as screws, bolts, or nuts, and more particularly to the improvement in the contour of a bolt head or nut.

Generally, upon designing the bolt head, various items such as the transmission efficiency of torque, the possibility of the bolt head being damaged, the fitting of a driving tool to the bolt head, the so-called "cam-out" of the driving tool, the ease of manufacture, etc. should be taken into consideration.

Conventionally, a screw is known which is formed with a slotted head or cross recessed head. This type of screw has the drawbacks that the screw is limited in transmission efficiency of torque and that the inner wall of the slot or recess is likely to be worn or damaged.

In the customary bolt or nut including a hexagonal head or body, a so-called "driving angle," which is defined by a radial line passing a force-applied point with a tangential line to the driver contour at the force-applied point, is large, i.e., denotes 60°. For this reason, the fastener driver is apt to slip on the outer wall of the bolt head when driving the bolt, so that torque loss is increased to cause the angular portions to be worn. As the result, said angular portions are likely to be rendered circular. In addition, a raw material of the bolt head has a circle-shaped cross section and should be subjected to trimming into a hexagonal cross section when worked, which unavoidably results in a complicated manufacturing process and increased manufacturing cost.

Further, U.S. Pat. No. 1,865,346 or French Patent No. 1,398,771 discloses a nut or bolt head formed at its outer periphery with grooves whose cross sections each assume a semicircular configuration. In this type of fastener element, a junction between one groove and the adjacent lobe formed between said one groove and another groove adjacent to the lobe is made angular, i.e., acute. Difficulties are therefore encountered in manufacturing the contour of the fastener element with high precision, and in addition said junction is very likely to be damaged when the fastener element is used. Further, though the fastener elements disclosed in said Patents might have a driving angle of 0°, any theoretical analysis for making the driving angle 0° is not made. For this reason, when an attempt is made to form said acute junction into a curved configuration, i.e., a smooth configuration, there is a fear that the driving angle becomes more than 0°.

Summary of the Invention

Accordingly, an object of the invention is to provide a fastener element which is capable of achieving an extremely high torque transmission efficiency and can be easily manufactured with high precision and is damaged only to a lesser extent.

Another object of the invention is to provide a fastener element whose measurement is best adapted for its mechanical strength so as to prevent the occurrence of damages even when torque transmission is totally effected.

A still another object of the invention is to provide a fastener element capable of attaining a ready attachability or detachability to or from the fastener driver and a good engagement therewith.

The fastener element of the invention has a male portion formed at its outer peripheral wall with a plurality of grooves and a plurality of lobes each defined between two adjacent grooves. In the cross section, the contour of each lobe constitutes a fractional arc of a larger circle, and each groove forms a smaller fractional circle. The inner wall of the groove is connected to the outer wall of the adjacent lobe by a wall portion whose cross section assumes a curved line. The center of the fractional circle is situated nearer to the center of the larger circle than a junction of two lines tangent to the larger circle at the imaginary intersections of the fractional circle and the larger circle. Further, the connection of the fractional circle and the curved line of said wall portion is situated at a contact point at which a radial line extending from the center of the larger circle is allowed tangentially to contact the fractional circle, or situated exteriorly of said contact point.

The essential matter of the aforesaid construction resides in where the center of the fractional circle and the starting point of the curved line starting from the outline of the fractional circle are situated. First, the center of the fractional circle is situated nearer to the center of the larger circle than the intersection of said two tangential lines. If construction is made as such, a radial line passing through the center of the larger circle and tangentially contacting the fractional circle will be able to be drawn without fail as apparent from the geometrical principle. Since said radial line always defines a right angle with a line connecting said contact point and the center of the fractional circle, a force-applied point is situated at said contact point. When a fastener driver having a complemental fitting recess engages the male portion of the fastener element, the driving torque force acts unfailingly perpendicular to the inner wall of the groove at said force-applied point, i.e., the driving angle (an angle defined by a radial line extending from the center of the male portion through a force-apppplied point on the surface thereof with a tangential line at said force-applied point on the surface of the fastener driver) is reduced to zero. The force exerted perpendicular to the force-applied point is therefore equal to the torque force imparted from the fastener driver to the fastener element, causing neither torque loss nor their wear.

Secondly, the fractional circle is connected to the larger circle not angularly but curvedly. As a result no angular portion appears, thus giving an extremely long life to the fastener device and improving the accuracy of the outline of the male portion during punching. The starting point of the curved line from the fractional circle is very important since the first feature can not be achieved if the starting point of the curved line is set off a certain point.

As clear from the foregoing description, this certain point is said contact point at which said radial line is allowed tangentially to contact the fractional circle. If said curved line starts from a point nearer to the center of the larger circle than said contact point of tangency, a tangential line to the remaining segment of the fractional circle will be never on a line radially extending from the center of the larger circle. Then, the force-applied point will be shifted to a point where the driving angle is not zero degree, resulting in a torque loss or wear of the fastener element. This phenomenon will also occur when the center of the fractional circle is disposed on said conjunction of the two tangential lines and the fractional and first circles are connected with each other by a curved line. That is because it is at the intersection of the first circle and fractional circle that the radial line extending from the center of the larger circle is allowed tangentially to contact the fractional circle and because when provision of said curved line is made said conjunction will disappear.

The center of the fractional circle of the groove is preferably situated on or outside a chord connecting the intersections of the fractional circle and the larger circle. Where the center of the fractional circle is positioned inside of the chord with respect to the center of the larger circle, the torque arm becomes short and the proportion of torque based on a force applied to the fastener driver becomes small.

The number of said grooves preferably ranges from four to eight, or particularly is six. Where the groove number decreases to below four, it is troublesome to position the driver relative to the fastener element. Where the groove number rises to above eight, the lobe defined between the adjacent grooves becomes small to render the lobe easily wearable and in addition to cause errors to be easily produced in the measurement and positions of the grooves during manufacture.

Preferably, said grooves are equidistantly spaced circumferentially of the male portion, and the diameter of the fractional circle of the groove is defined by the equation:

$$\frac{1}{5} \cdot \frac{\pi}{n} \cdot D_0 \leq d_0 \leq \frac{1}{2} \cdot \frac{\pi}{n} \cdot D_0 \qquad (1)$$

where $n$ represents the number of grooves, $d_0$ the diameter of the groove fractional circle and $D_0$ the diameter of the larger circle of the male portion.

When the diameter of the groove fractional circle is so determined, even the total torque transmission causes occurrence of damages neither in the fastener element nor in the driver. The reasons are as follows.

Usually, material constituting a bolt, screw or nut is so standardized as to have a tensile strength $\sigma_B$ of 45 – 180 kg/mm² while material constituting a fastener driver is so standardized as to have a tensile strength $\sigma_B$ of 120 – 180 kg/mm². Since the shearing strength of this type of material, particularly steel, can be regarded as proportional to the tensile strength thereof, the ratio of the shearing strength of the fastener element to that of the fastener driver ranges from 1.5 : 1 to 1 : 4. And, since the shearing strength of the fastener element does not usually exceed that of the fastener driver, said ratio comes to range from 1 : 1 to 1 : 4. It is understood from the above that if the width ratio of the force-transmitted portion (i.e., the element lobe defined between two adjacent grooves of the fastener element) to the force-transmitting portion (i.e., the driver protrusion to be engaged with the element groove) ranges from 1 : 1 to 4 : 1, the shearing resistances of both the element lobe and the driver protrusion will be equalized. Since the width of the driver protrusion is substantially equal to the width of the element groove and this groove width approximates to the diameter $d_0$ of the groove fractional circle, the diameter $d_0$ is defined by the equation:

$$\frac{1}{4} \cdot l \leq d_0 \leq l \qquad (2)$$

where $l$ represents the lobe width of the fastener element.

On the other hand, the lobe width is substantially equal to the arc length of the outer peripheral edge of said lobe, and can therefore be expressed as follows.

$$l \approx \frac{\pi}{n} \cdot D_0 - d_0 \qquad (3)$$

Accordingly, the equation (1) is derived from the equations (2) and (3). Where the groove number n is set to, for example, six, the relationship between the diameter of the groove fractional circle and the diameter of the larger circle of the male portion will be expressed by the equation:

$$0.1 \, D_0 \leq d_0 \leq 0.25 \, D_0 \qquad (4)$$

Actually, the fastener element whose tensile strength bears the ratio of 1 : 2 to 1 : 3 to that of the fastener driver is most widely in use. When, therefore, consideration is given to practicability and economy, the diameter of the groove fractional circle preferably is defined as follows.

$$\frac{1}{4} \cdot \frac{\pi}{n} \cdot D_0 \leq d_0 \leq \frac{1}{3} \cdot \frac{\pi}{n} \cdot D_0 \qquad (5)$$

Preferably, said grooves are each allowed to extend with a constant radius from the upper end of the male portion to the lower end thereof and each tapered at an angle of $\alpha$ expressed by the following equation (6) with respect to the central axis of the male portion $$\alpha < \tan^{-1}\mu \qquad (6)$$

where $\alpha$ represents the taper angle with respect to the central axis of the male portion and $\mu$ represents the coefficient of statical friction of material constituting the fastener element.

When the grooves are so tapered, the fastener element can be pulled out easily from the die at the final stage of its manufacture. Moreover, the fastener element, once fitted with the fastener driver firmly, hardly falls off the fastener driver owing to its own weight. The reasons are as follows. When the fitting recess of the fastener is fitted to the male portion of the fastener element, the inner wall of said fitting recess gives a fitting force perpendicularly acting on the male portion to the same. Then the following formulae should be established if the fastener element is not to fall under its own weight:

$$\mu \cdot X \cos \alpha > X \sin \alpha + W/n \qquad (7)$$

$$\mu > \tan \alpha + \frac{W}{X} \cdot \frac{1}{n} \cdot \sec \alpha \qquad (8)$$

where $X$ represents the fitting force perpendicularly acting on the male portion, $n$ the number of grooves, $W$ the weight of the fastener element, and $\mu$ the coefficient of statical friction between the male portion and the driver.

Since $X \gg W/n$ and $\sec \alpha \approx 1$, the formula (8) is rewritten as follows.

$$\mu > \tan \alpha \qquad (9)$$

Accordingly, the formula (7) is derived from the formula (9).

Generally the coefficient of statical friction between steel blocks ranges from 0.15 to 0.25 when the block surfaces are dry and ranges from 0.14 to 0.18 when the block surfaces are coated with oil. Therefore, when the fastener element is made of steel, then $$\tan \alpha < 0.25 \text{ or preferably } \tan \alpha < 0.14$$
$$0° < \alpha < 10° \text{ or preferably } 0° < \alpha < 7°.$$

DETAILED DESCRIPTION OF THE INVENTION

Figure 1:
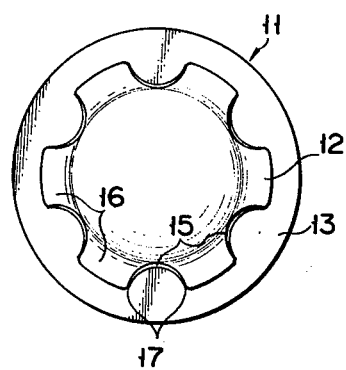
FIG. 1 is a plan view of a bolt according to an embodiment of the invention.
Figure 2:
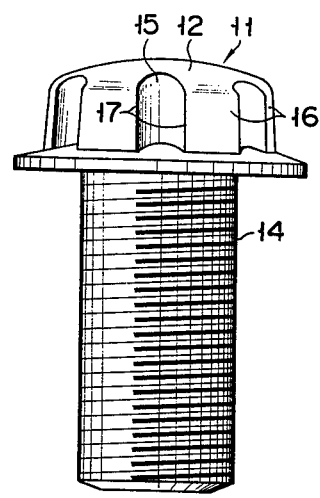
FIG. 2 is a side view of FIG. 1.

FIGS. 1 and 2 respectively show a steel bolt 11 according to the invention. The bolt comprises a male portion or head 12, a flange like washer 13 radially extending from the bottom portion of said head, and a threaded shank 14 axially protruding from said washer opposite to the head. Said head 12 is formed in its outer peripheral wall with six grooves 15 disposed equidistantly from each other and six lobes 16 each defined between two adjacent grooves. The inner wall of each groove is connected to the outer wall of the lobe 16 through a curved wall portion 17.

Figure 3:
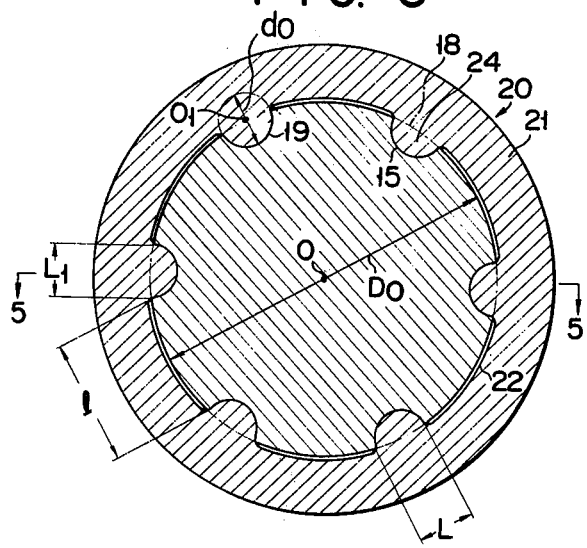
FIG. 3 is a cross sectional view taken along the line 3—3 of FIG. 5, showing the condition wherein the bolt of FIG. 1 is fitted to a corresponding fastener driver.
Figure 4A:
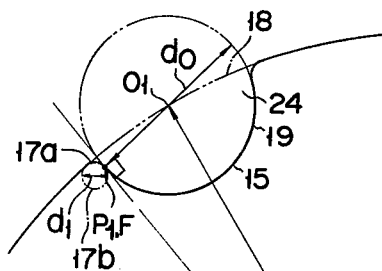
FIG. 4A is a partly enlarged simplified view of FIG. 3, showing the principle of the relation between the center position of the fractional circle of the groove and the driving angle.

As shown in FIGS. 3 and 4A, the respective outer walls of the lobes 16 each constitute a segmental outline of an imaginary larger circle 18 at its cross section, and the grooves 15 each form a fractional circle 19. Further, the cross section of the curved wall portion 17 forms a curved line 17a tangentially connected to the segmental outline of the larger circle 18 and to the outline of the fractional circle 19. In the case of this embodiment, the curved line 17a forms a segmental outline of an imaginary small circle 17b inscribed to the larger circle 18 and circumscribed to the fractional circle 19.

Figure 5:
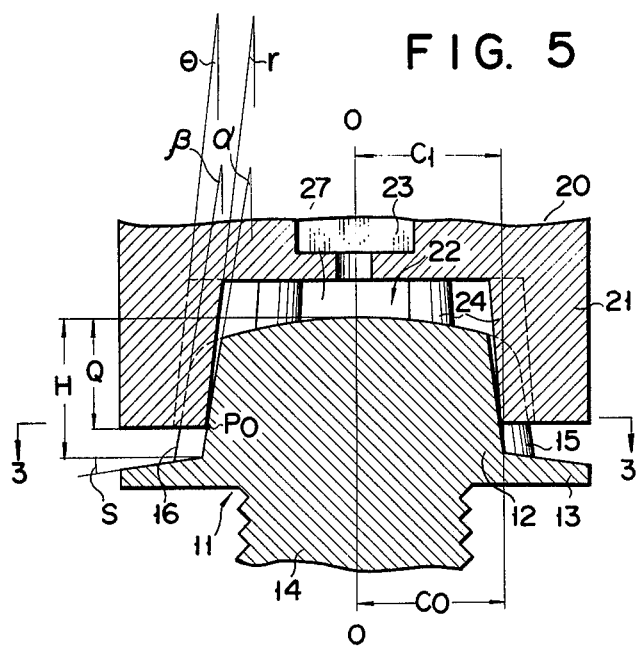
FIG. 5 is a longitudinal sectional view taken along the line 5—5 of FIG. 3.

Referring to FIGS. 3 and 5, the bolt head 12 is fitted to an engaging recess 22 formed in a fitting portion 21 of a driver 20 made of steel. The recess 22 presents a cross sectional configuration complementary to that of the head 12. Said fitting portion 21 is formed at its upper part with a hole 23 having a rectangular cross section. A handle grip, not shown, is adapted to be inserted into the hole 23 so as to rotate the driver.

Engagement protrusions 24 formed in the inner wall of said recess respectively present a substantially semicircular cross section complementary to that of the grooves 15 and are engaged with the respective grooves. The effective transmission of driving torque from the driver engagement protrusion 24 to the bolt head lobe 16 requires for a "driving angle" to be taken into account. This driving angle is the one defined by a radial line passing a certain point (that is, a force-applied point at which the driver is allowed to press the bolt head when fastening or releasing the bolt) with a tangential line to the contour of the driver recess at said force-applied point. Where the driving angle is positive with respect to the driver-driven direction, a component of force is produced which interrupts torque from being sufficiently transmitted to the bolt head and further causes the driver to be slipped on the outer wall of the bolt head. Due to this slippage is increased the possibility of the side corners of the bolt head lobe being worn or damaged. On the other hand, where the driving angle is 0° with respect to the driver-driven direction, the above-mentioned slippage does not occur, thereby effecting an extremely efficient torque transmission and attaining a good engagement of the driver with the bolt head. In view of this respect, this invention is designed to determine the shape of the bolt head groove 15 so that the driving angle is 0° with respect to the driver-driven direction.

Figure 4B:
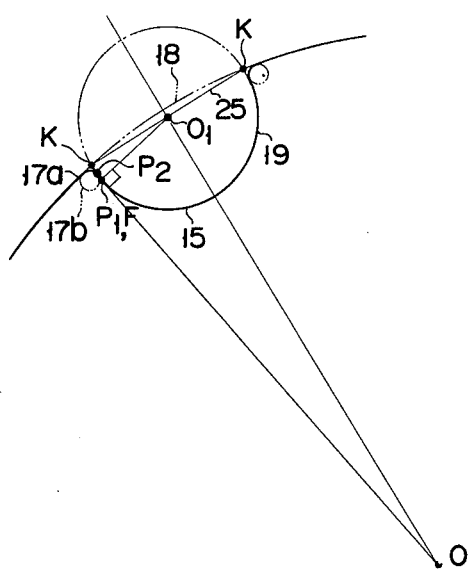
FIG. 4B is a view similar to FIG. 4A, showing a modification wherein the center position of the fractional circle is situated at a different position.
Figure 4C:
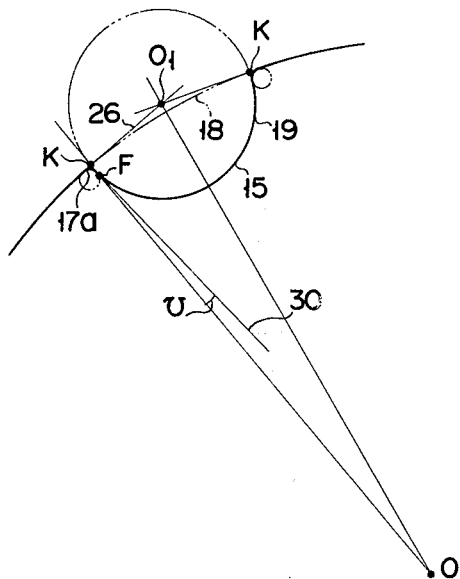
FIG. 4C is a reference view for a better understanding of the invention, showing the condition wherein the driving angle is more than 0°.

FIGS. 4A to 4C respectively schematically show the relationship between various center positions of the semicircle of the groove 15 and the driving angle. Since the cross sectional configuration of the bolt head can be regarded as substantially the same as that of the driver recess 22, the outer wall of the head and the inner wall of the recess are drawn by the same curved lines in FIGS. 4A to 4C.

Referring to FIG. 4A, the center $0_1$ of the fractional circle 19 is situated on the outline of the larger circle 18, and the curved line 17a is continuously connected to the outline of the fractional circle 19 at a contact point $P_1$ at which a radial line extending from the center 0 of the larger circle 18 is allowed tangentially to contact the fractional circle 19. In this embodiment, since torque force can act on the inner wall of the groove 15 perpendicularly thereto at the point $P_1$, the force-applied point F is situated just on the point $P_1$. Thus, the tangential line to the driver protrusion 24 at the point $P_1$ coincides with the radial line $\overline{OP_1}$. Accordingly, the driving angle denotes 0° to permit the total transmission of torque from the protrusion 24 to the lobe 16. In this embodiment, the diameter $d_1$ of the small circle 17b has the following relationship with the diameter $D_0$ of the larger circle 18.

$$\frac{d_1}{2} = \frac{D_0}{2} - \frac{D_0}{2} \cdot \cos \delta$$

where the angle $\delta$ is an angle defined between the lines $\overline{O_1 O}$ and $\overline{P_1 O}$ and is determined by the diameter $d_o$ of the fractional circle 19 relative to the diameter $D_0$ of the larger circle 18.

In the modification of FIG. 4B, the center $O_1$ of the fractional circle 19 is situated on the chord 25 connecting together the intersections K of the larger circle 18 and fractional circle 19. Also in this case, the force-applied point F is situated just on the contact point $P_1$ at which a radial line extending from the center O of the larger circle 18 is allowed tangentially to contact the fractional circle 19. Accordingly, the driving angle becomes 0° similarly to the above-mentioned embodiment. In the case of this modification, the curved line 17a is connected to the outline of the fractional circle 19 at a point $_2$ situated exteriorly of the point $P_1$ with respect to the center O of the larger circle 18.

For a better understanding of the invention, explanation is now made, referring to FIG. 4C, of the case where the center $0_1$ of the fractional circle 19 is situated on a conjunction of lines 26 tangent to the larger circle 18 at the intersections K of the fractional circle 19 and larger circle 18. In such a case, a radial line extending from the center O of the larger circle is allowed tangentially to contact the fractional circle 19 at said intersection K. Since, however, according to the invention, the intersection K is cut away by the curved line 17a, such intersection K does not actually exist. For this reason, the force-applied point is shifted to the point F of FIG. 4C and as a result the tangential line 30 tangent to the fractional circle __19__ at this point F does not coincide with a radial line $\overline{OF}$. As a result, a positive driving angle $\Omega$ is produced, which results in a fear that the driver is caused to slip on the bolt head to cause it to be damaged. As apparent from the foregoing description, the center $O_1$ of the fractional circle 19 should be situated nearer to the center O of the larger circle 18 than the conjunction of said tangential lines 26.

In this invention, consideration is given to the material quality of bolt and driver in addition to properly positioning the center of said fractional circle of the groove, so as to prevent the occurrence of driver or bolt damages even when torque is totally transmitted from the driver to the bolt.

As previously mentioned, where the shearing strengths of materials used to make bolt or driver are taken into account, it is understood that the ratio of the width of the driver protrusion 24 to that of the bolt lobe 16 has to be made to range from 1 : 1 to 1 : 4, or preferably from 1 : 2 to 1 : 3 in order to equalize the shearing resistances of the bolt and the driver in the vicinity of the force-applied and force-applying points. Again in FIG. 3, the width L of the engagement protrusion 24 is substantially equal to the width $L_1$ of the groove 15 and the groove width $L_1$ approximates to the diameter $d_0$ of the fractional circle 19. Therefore, the relationship between the width $l$ of the lobe 16 and the diameter $d_0$ of the semicircle is defined as follows.

$$\frac{1}{4} \cdot l \leq d_0 \leq l$$

or preferably $$\frac{1}{3} \cdot l \leq d_0 \leq \frac{1}{2} \cdot l$$

On the other hand, the width $l$ is substantially equal to the arc length of the circle 18 defined between two adjacent fractional circles. Therefore, $$l \approx \frac{1}{n} \pi D_0 - d_0$$

When the latter equation is substituted in the former equation, $$\frac{1}{5} \cdot \frac{\pi}{n} \cdot D_0 \leq d_0 \leq \frac{1}{2} \cdot \frac{\pi}{n} \cdot D_0$$

or preferably $$\frac{1}{4} \cdot \frac{\pi}{n} \cdot D_0 \leq d_0 \leq \frac{1}{3} \cdot \frac{\pi}{n} \cdot D_0$$

Since, in this embodiment, the number $n$ of grooves 15 is six, the diameter $d_0$ of the fractional circle 19 has to bear the following relationship with the diameter $D_0$ of the circle 18.

$$0.1 D_0 \leq d_0 \leq 0.25 D_0$$

or preferably $$0.12 D_0 \leq d_0 \leq 0.17 D_0$$

When the diameters of the fractional circle 19 and the larger circle 18 are set as above, the respective shearing resistances of the driver engagement protrusion 24 and the bolt lobe 16 are mutually equalized. Even if, therefore, torque transmission is totally effected from the driver to the bolt, neither will be damaged.

In contrast, where $$d_0 > \frac{1}{2} \cdot \frac{\pi}{n} \cdot D_0,$$

the bolt becomes liable to be damaged. Conversely, where $$d_0 < \frac{1}{5} \cdot \frac{\pi}{n} \cdot D_0,$$

the driver becomes liable to be damaged.

As will be understood from FIGS. 1, 2 and 5, each groove 15 is extended from a substantial upper end of the head 12 to the lower end thereof and has a constant radius over its entire length. Further, each groove 15 is inclined at an angle of $\alpha$ to the central axis O-O. In other words, the central axes of the grooves are all converged at a point on the central axis O-O of the bolt. The outer wall of the lobes 16, i.e., the outer wall of the bolt head 12 forms part of the conical face, and the generatrix of this conical face defines an angle of $\alpha$ with the central axis O-O. The angles $\alpha$ and $\beta$ are mutually equalized and defined within the range of $0° < \alpha = \beta$ ≦ 10°, preferably 0° < $\alpha = \beta$ ≦ 7°. In the case of this embodiment, $\alpha$ and $\beta$ are both set at 5.45°.

On the other hand, the engagement protrusion 24 of the driver and an engagement groove 27 formed between adjacent two of said engagement protrusions are respectively tapered at angles of $\gamma$ and $\theta$ with respect to the central axis O-O and bear the following relationship with the angles $\alpha$ and $\beta$.

$$\alpha = \beta > \gamma = \theta$$

Further, a maximum distance $C_0$ between the bottom of the groove 15 and the central axis O-O of the bolt head bears the following relationship with a maximum distance $C_1$ between the apex of the engagement protrusion 24 and the central axis O-O of the driver.

$$C_0 > C_1$$

The maximum outer diameter $D_0$ of the bolt head bears the following relationship with the maximum inner diameter $D_1$ of the fitting recess 22 of the driver.

$$D_0 < D_1$$

In the case of this embodiment, the interval between the inner wall of the groove 21 and the central axis O-O is so set as to prevent the lobe 16 of the bolt head from being engaged with the inner wall of the engagement groove 27 of the driver even when the protrusion 24 of the driver 20 is brought into engagement with the inner wall of the groove 15 of the bolt head 12. Further, the washer 13 is tapered at an angle of S (In this embodiment, S is set at 15°). When, under this condition, the height of the bolt head, namely, the distance between the upper end of the washer 13 and the upper end of the head is designated by H, and the distance between the head upper end and the engagement point $P_0$ of the head with the driver is represented by Q, the following relationship is always established.

$$Q < H$$

For this reason, when the driver is fitted to the head, the driver is usually avoided from abutting against the upper surface of the washer but reliably fitted to the bolt head at points slightly above the washer upper end, thereby to be prevented from being readily disengaged from the bolt head.

Figure 6:
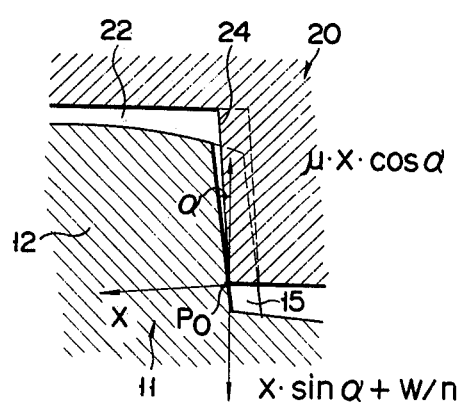
FIG. 6 is a schematic sectional view showing the relation between the taper angle of the groove and the fitting of the driver.

This bolt 11 does not fall off from the driver 20 owing to its own weight. As shown in FIG. 6, when the recess 22 of the driver 20 is fitted to the bolt head 12, each protrusion 24 of the driver 20 is engaged at the point $P_0$ with the inner wall of each groove of the bolt head 12. When it is now assumed that X represents a force perpendicularly acting on the inner wall of the groove 15 of the bolt head from the protrusion 24 of the driver 20, W the weight of the bolt 11, $n$ the number of grooves 15, and $\mu$ the coefficient of statical friction between the bolt head and the driver 20, a force so acting as to hold the bolt with the driver i.e., the frictional force is expressed by $\mu \cdot X \cdot \cos \alpha$ whereas a force so acting as to cause the bolt to fall off from the driver 20 is expressed by $X \cdot \sin \alpha + W/n$. Accordingly, if the following equation is satisfied, the bolt will not be disengaged from the driver 20 owing to its own weight.

$$\mu \cdot X \cdot \cos \alpha > X \cdot \sin \alpha + W/n$$

Accordingly, $\alpha < \tan^{-1} \mu$. Since as previously stated, $\mu$ ranges from 0.15 to 0.25 or ranges from 0.14 to 0.18, $$0° < \alpha < 10° \text{ or preferably } 0° < \alpha < 7°$$

Further, a screw of this type is molded by pressing or cold forging. At this time, the high mold-releasability of bolt from the metal mold is attained on account of the tapered configuration of the molded article, i.e., the bolt head.

Figure 7:
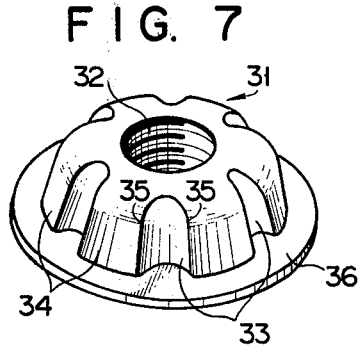
FIG. 7 is a perspective view of a nut according to another embodiment of the invention.
Figure 8:
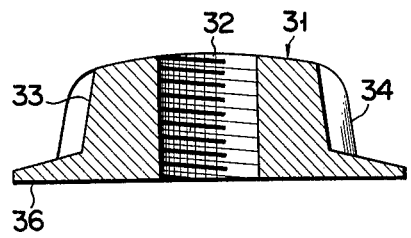
FIG. 8 is a longitudinal sectional view of the nut of FIG. 7.

FIGS. 7 and 8 respectively show a nut according to the invention. This nut comprises a body 31 formed at its central part with a screw hole 32. A plurality of grooves 33, lobes 34, curved wall portions 35 and a washer 36 formed in the outer periphery of the body have the same configurations as those shown in FIGS. 1 to 6.

Figure 9:
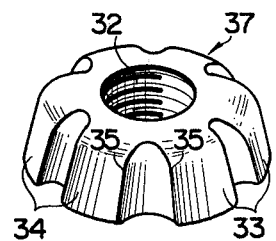
FIG. 9 is a perspective view of the nut according to still another embodiment of the invention.

FIG. 9 shows another nut. This nut 37 is the same as the nut illustrated in FIGS. 7 and 8 excepting that it has no washer.

This invention can be practised in various modifications without departing from the object or scope of the invention.

What we claim is:

1. A fastener element having a male head portion the outer periphery of which is provided with a plurality of substantially longitudinal grooves and a plurality of lobes each defined between two adjacent grooves, each of said grooves being arcuate in cross section and having a constant radius over its entire length and being inclined outwardly toward the forward end of the fastener element with respect to the central axis thereof at a predetermined angle $\alpha$, and each of said lobes being inclined outwardly toward the forward end of said fastener element with respect to said central axis thereof at a predetermined angle $\beta$, each of said grooves being tangentially connected to the adjacent lobe through a smoothly curved wall portion, the outer periphery of each of said lobes in cross section forming a segmented outline of a first circle, each of said grooves in cross section forming a fractional circle, the cross section of said curved wall portion forming a curved line, the center of said fractional circle being situated at a point positioned between a point nearer to the center of the first circle than the junction of two tangential lines which are tangent to the first circle at the intersections of the first circle and the fractional circle and a point on a chord between said intersections, and said curved line being tangentially connected to the fractional circle at a point positioned not nearer to the center of the first circle than a contact point at which a radial line extending from the center of the first circle tangentially contacts the fractional circle.

2. A fastener element according to claim 1, wherein said curved line forms a segmental outline of a second circle inscribed to said first circle and circumscribed to said fractional circle.

3. A fastener element according to claim 2, wherein the diameter of said second circle is defined as follows $$\frac{d_1}{2} = \frac{D_0}{2} - \frac{D_0}{2} \cos \delta$$

where $d_1$ represents the diameter of the second circle, $D_0$ the diameter of the first circle, and $\delta$ an angle defined between a straight line connecting the center of the fractional circle to the center of the first circle and a straight line connecting the center of the first circle to said contact point on the circumference of the fractional circle.

4. A fastener element according to claim 1, wherein said curved line is connected to the outline of the fractional circle at said contact point on the circumference of the fractional circle.

5. A fastener element according to claim 1, wherein the center of the fractional circle is situated on the outline of the first circle.

6. A fastener element according to claim 1 wherein said angle $\alpha$ is defined by the inequality:

$$\alpha < \tan^{-1} \mu$$

where $\mu$ represents the coefficient of static friction of the material constituting the fastener element.

7. A fastener element according to claim 6, wherein said fastener element is male of steel, and said $\alpha$ is defined by the inequality:

$$0° < \alpha < 10°.$$

8. A fastener element according to claim 7, wherein said $\alpha$ is defined by the inequality:

$$0° < \alpha < 7°.$$

9. A fastener element according to claim 6, wherein the grooves of the male portion are equidistantly spaced circumferentially of the male portion, and the diameter of said fractional circle is defined by the equation:

$$\frac{1}{5} \cdot \frac{\pi}{n} \cdot D_0 \leq d_0 \leq \frac{1}{2} \cdot \frac{\pi}{n} \cdot D_0$$

where $D_0$ represents the diameter of the first circle, $d_0$ the diameter of the fractional circle, and n the number of the grooves.

10. A fastener element according to claim 9, wherein the number of said grooves is four to eight.

11. A fastener element according to claim 9, wherein said male portion constitutes a bolt head and has a concentrical threaded shank.

12. A fastener element according to claim 11, wherein a flange shaped washer is formed between said head and shank.

13. A fastener element according to claim 9, wherein said male portion constitutes a nut body and is formed with a concentrical screw hole.

14. A fastener element according to claim 13, wherein said male portion has at its bottom portion a flange shaped washer.

* * * * *